United States Patent [19]

Rudolph et al.

[11] 4,426,810
[45] Jan. 24, 1984

[54] PROCESS OF GASIFYING SOLID FUELS

[75] Inventors: Paul Rudolph, Bad Homburg; Rainer Reimert, Idstein; Osman Turna, Frankfurt am Main, all of Fed. Rep. of Germany

[73] Assignee: Metallgesellschaft Aktiengesellschaft, Frankfurt am Main, Fed. Rep. of Germany

[21] Appl. No.: 337,345

[22] Filed: Jan. 6, 1982

[30] Foreign Application Priority Data

Sep. 25, 1981 [DE] Fed. Rep. of Germany ....... 3138124

[51] Int. Cl.³ ............................................... C10J 3/54
[52] U.S. Cl. .................................. 48/197 R; 48/202; 48/206; 252/373
[58] Field of Search ..................... 48/202, 206, 197 R; 252/373; 122/4 D

[56] References Cited

U.S. PATENT DOCUMENTS

| | | | |
|---|---|---|---|
| 4,056,483 | 11/1977 | Baron | 48/202 X |
| 4,057,402 | 11/1977 | Patel et al. | 48/202 X |
| 4,146,369 | 3/1979 | Flesch et al. | 48/202 X |
| 4,211,540 | 7/1980 | Netzer | 48/202 |
| 4,235,625 | 11/1980 | Tippmer | 48/202 X |
| 4,347,064 | 8/1982 | Reh et al. | 48/202 X |

Primary Examiner—Arthur D. Kellogg

Attorney, Agent, or Firm—Sprung, Horn, Kramer & Woods

[57] ABSTRACT

Coarse-grained solid fuels in particle sizes of at least 2 mm are gasified under a pressure of 5 to 150 bars in a fixed bed which is slowly descending and into which the gasifying agents are introduced from below whereas the incombustible mineral constituents are withdrawn as solid ash or liquid slag from the lower end of the bed. Fine-grained solid fuels are gasified in a fluidized bed under a pressure of 1 to 100 bars. Oxygen, steam and/or carbon dioxide are used as gasifying agents for the gasification in the fixed bed and in the fluidized bed. The product gas from the fluidized-bed gasifier has a temperature of 700° to 1200° C. and is indirectly cooled with water. The resulting steam is fed as gasifying agent to the fixed-bed gasifier. The product gas from the fixed-bed gasifier can be indirectly cooled to produce steam and at least part of said steam is fed as gasifying agent to the fluidized-bed gasifier. The steam fed as gasifying agent to the fixed-bed gasifier has a temperature of about 300° to 600° C., preferably of about 400° to 500° C.

The steam produced by an indirect heat exchange with the product gas from the fixed-bed gasifier can be superheated by an indirect heat exchange with the product gas from the fluidized-bed gasifier before said steam is fed as gasifying agent to the fluidized-bed gasifier.

10 Claims, 1 Drawing Figure

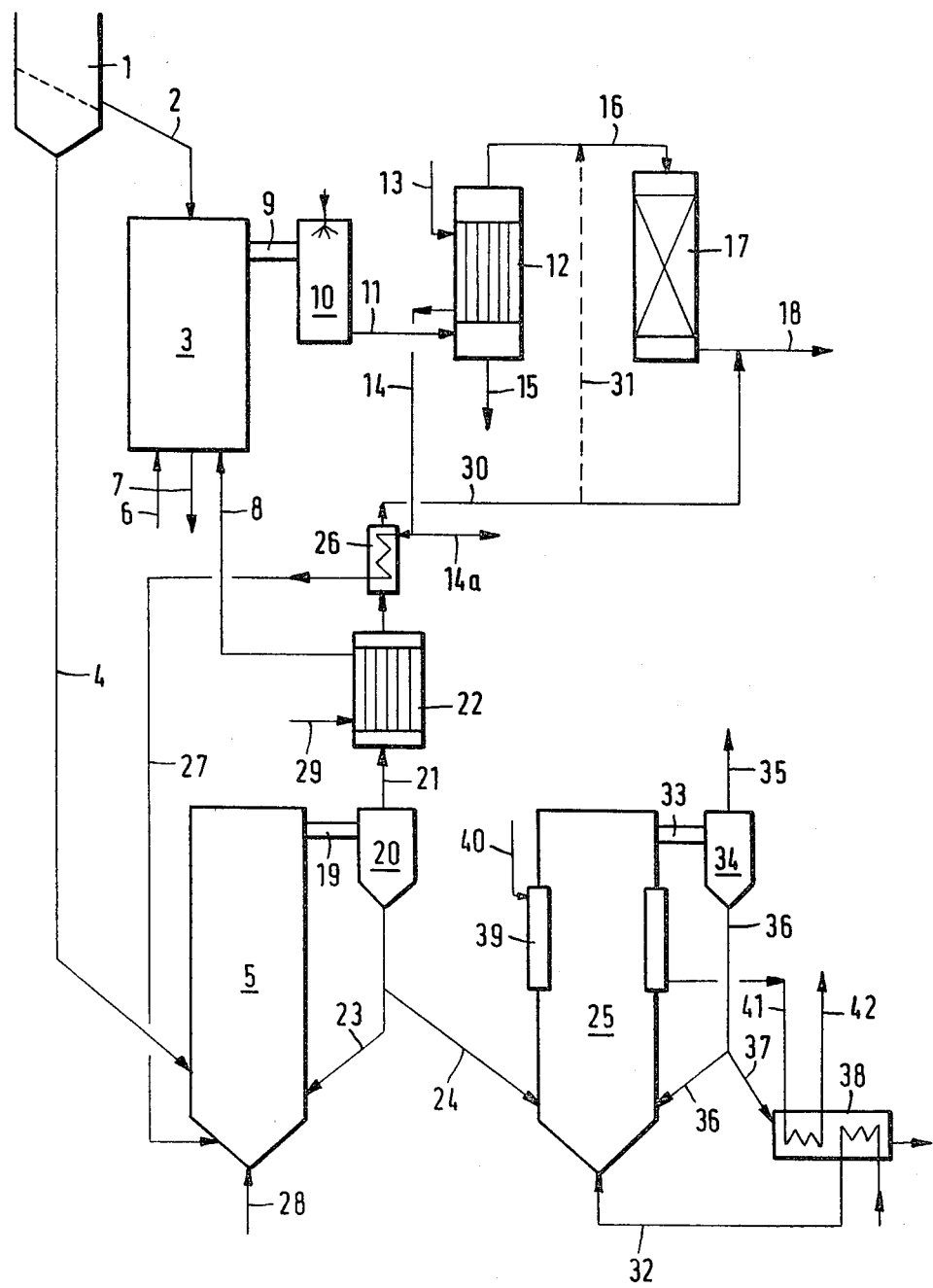

PROCESS OF GASIFYING SOLID FUELS

BACKGROUND OF THE INVENTION

1. Field of the Invention

This invention relates to a process of gasifying solid fuels with gasifying agents that contain oxygen, water vapor and/or carbon dioxide, wherein coarse-grained solid fuels in particle sizes of at least 2 mm are gasified under a pressure of 5 to 150 bars in a fixed bed while said bed is slightly descending, the gasifying agents are introduced into the fixed bed from below and the incombustible mineral constituents are withdrawn from the lower end of the fixed bed as solid ash or liquid slag, and wherein fine-grained solid fuels are gasified in a fluidized bed under a pressure of 1 to 100 bars.

2. Discussion of Prior Art

The gasification of granular coal in a fixed bed is known and has been disclosed, e.g., in Ullmanns Encyklopädie der technischen Chemie, 4th edition (1977) volume 14, on pages 383 to 396. Details of the gasifying process in which the ash remains solid are apparent from U.S. Pat. Nos. 3,540,867 and 3,854,895 and the German Offenlegungsschrift No. 22 01 278. The modification of the process involving a withdrawal of liquid slag is explained in British Nos. 1,507,505; 1,508,671 and 1,512,677.

The gasification of fine-grained solid fuels in a fluidized bed is known from German Offenlegungsschrift No. 26 11 191 and the corresponding U.S. Pat. No. 4,026,679 and from U.S. Pat. No. 2,662,816 and 4,077,778. The gasification of coal in a circulating fluidized bed is explained in detail in U.S. Pat. No. 4,032,305.

It is an object of the invention to provide a favorable combination of the gasification in a fixed bed and the gasification in a fluidized bed so that the solid fuels, particularly coals, which become available in a very wide particle size range as they are mined, can be gasified completely and without an agglomeration of the fine-grained solids.

SUMMARY OF INVENTION

This is accomplished, in accordance with the invention, in that the product gas formed in the fluidized-bed gasifier and having a temperature of 700° to 1200° C. is indirectly cooled with water to produce steam, which is then supplied as a gasifying agent to the fixed-bed gasifier. The steam is superheated to ensure that it has a sufficiently high temperature as it enters the fixed-bed gasifier.

It is desirable to indirectly cool with water the product gas from the fixed-bed gasifier and to supply at least part of the resulting steam as a gasifying agent to the fluidized-bed gasifier.

The fine-grained solid fuels of practiculate size below 5 mm are preferably gasified in a circulating fluidized bed, in which higher throughput rates can be achieved than in a conventional fluidized bed. In that operation, pressures of 1 to 100 bars, preferably 1 to 30 bars, are maintained in the circulating fluidized bed and the product gas therefrom has a temperature of 800° to 1100° C.

BRIEF DESCRIPTION OF DRAWING

Further improvement which can be effected in the process are explained with reference to the accompanying drawing which is a flow diagram showing a mode for carrying out the invention.

DESCRIPTION OF SPECIFIC EMBODIMENT

Coal having a wide particle size range up to about 70 mm is first supplied to the clasifier 1, in which the coarse particles above a lower particle size limit of preferably 2 to 5 mm are separated; these coarse particles are then supplied in duct 2 to the fixed-bed gasifier 3. The remaining fine-grained coal is supplied through duct 4 to the fluidized-bed gasifier 5. The coal in duct 4 may be ground and/or dried, if necessary.

The gasification in the fixed bed is carried out in a manner known per se. Oxygen or a high-oxygen gas is supplied through duct 6 and slag or ash is withdrawn through duct 7. Steam is supplied as an additional gasifying agent through duct 8.

The product gas from the gasifier 3 is supplied through a passage 9 to a scrubber-cooler 10, where it is sprayed with a liquid consisting mainly of water and is thus cooled to temperatures of about 150° to 220° C. The cooled product gas flows through duct 11 to a waste-heat boiler 12 and is indirectly cooled therein with feed water from conduit 13. The resulting steam leaves the waste-heat boiler 12 through conduit 14. Aqueous condensate is supplied through conduit 15 and subjected to further processing in known manner.

If the product gas is to be used as synthesis gas, it is supplied in duct 16 to a catalytic shift converter 17, where $H_2O$ and $CO$ are converted at least in part to $H_2$ and $CO_2$. Raw synthesis gas leaves the shift converter 17 through the duct 18 and is then supplied, e.g., to an additional cooler and fine purifier.

A circulating fluidized bed is maintained in the fluidized-bed gasifier 5. Solids and product gas are supplied in a passage 19 to a separator 20, which may consist of a cyclone separator. The hot product gas has temperatures of 800° to 1100° C. and flows in duct 21 to an indirect heat exchanger 22. Part of the solids separated in the separator 20 is returned through duct 23 to the gasifier. The remaining solids are supplied through duct 24 to a furnace 25.

The steam required in the gasifier 5 is supplied through duct 14 and is heated to temperatures of about 200° to 350° C. in the heat exchanger 26 and then supplied through duct 27 to the lower portion of the gasifier 5. Oxygen or high-oxygen gas is supplied through duct 28. Surplus steam is withdrawn in duct 14a.

In the heat exchanger 22, the hot product gas from the gasifier 5 is indirectly cooled by means of feed water, which is supplied in conduit 29. The heat exchanger 22 may consist of a plurality of stages and generates superheated steam at temperatures of about 300° to 600° C., preferably about 400° to 500° C., which is supplied through duct 8 to the fixed-bed gasifier 3. The product gas is cooled further in the heat exchanger 26 and the heat dissipated in the latter is used to superheat the steam supplied through duct 14.

The cooled product gas from gasifier 5 leaves the heat exchanger 26 through duct 30 and is admixed to the product gas in duct 18. As is indicated by the dotted line 31, all or part of the product gas in duct 30 may be admixed to the gas in duct 16 if a gas having a higher CO content is to be supplied to the shift converter 17.

Carbonaceous gasification residue from duct 24 is burnt in the reactor 25 by means of air from duct 32. In the present case a circulating fluidized bed is also maintained in the furnace 25 and gas and solids flow through the passage 33 to the separator 34. The flue gas in duct 35 need not be desulfurized before entering the atmosphere because the sulfur content of the fuels in duct 4 has already entered the product gas from the gasifier 5. Part of the solids that have been separated in the separator 34 are returned in duct 36 to the combustion zone; the remainder is supplied through duct 37 to a solids cooler 38.

The furnace 25 incorporates a boiler 39, which is supplied with feed water through duct 40. The resulting steam flows through duct 41 to the solids cooler 38 and is superheated therein. The resulting superheated steam is available in duct 42 and may be used, e.g., as a gasifying agent in the fixed-bed gasifier 3 and/or the fluidized-bed gasifier 5. If the steam is not required for that purpose, it may be used, e.g., to generate electric power. The combustion air of duct 32 is also heated in the solids cooler 38.

EXAMPLE 1000 kg pit coal were gasified in a pilot plant as shown on the drawing. The coal had the following composition in percent by weight:

| | |
|---|---|
| Ash | 20 |
| Moisture | 10 |
| C | 78.6 |
| H | 4.7 |
| O | 13.5 |
| N | 2.2 |
| S | 1.0 |

600 kg of the coal had a particle size of at least 3 mm and were supplied to the fixed-bed gasifier 3. The fine-grained remaining coal was supplied to the gasifier 5, in which a circulating fluidized bed was formed. The fixed-bed gasifier consisted of a known Lurgi gas generator comprising a rotary grate and means for withdrawing solid ash.

The gasification was effected in both cases with a steam-oxygen mixture, in the fixed bed at 27 bars and in the circulating fluidized bed at 1 bar. The steam-oxygen ratio was 4.0 kg per m$^3$ (NTP) in the fixed-bed gasifier and 1.2 kg per m$^3$ (NTP) in the fluidized-bed gasifier 5. Gases having the stated qualities were produced in the following quantities:

| | Fixed-bed gasifier | Fluidized-bed gasifier |
|---|---|---|
| Quantity of gas, m$^3$ (NTP) | 1332.1 | 559.2 |
| Temperature, °C | 464 | 1095 |
| Composition in % by volume | | |
| $H_2$ | 39.8 | 39.0 |
| CO | 21.7 | 39.3 |
| $CH_4$ | 9.3 | 1.6 |
| $C_nH_m$ | 0.5 | — |
| $CO_2$ | 28.0 | 17.9 |
| $H_2S$ | 0.3 | 0.5 |
| $N_2$ + Ar | 0.4 | 1.7 |
| | 100.0 | 100.0 |

As about 60% of the coal supplied to the fluidized-bed gasifier 5 were converted therein, about 134 kg coke were supplied to the fluidized-bed furnace 25. In addition to the components mentioned above, the raw gas from the fixed-bed gasifier contained ammonia, carbon oxysulfide, tar, oil, naphtha, phenols and fatty acid; these components will not be further dealt with here.

462 kg saturated steam of 6 bars were generated in the waste-heat boiler 12 and withdrawn therefrom in duct 14. 172 kg of that steam were superheated to 250° C. in the heat exchanger 26 and were then supplied through duct 27 to the fluidized-bed gasifier. 1565 kg saturated steam of 40 bars were generated in the heat exchanger 22. 1030 of that steam were superheated to 380° C. and then supplied as gasifying steam through duct 8 to the fixed-bed gasifier 3.

The remaining steam and gaseous and liquid by-products were used as motive fluids to generate about 140 kWh of electric energy.

619 kg pure methanol can be produced in known manner from the stated quantities of gas. Only 80% of that quantity of methanol can be produced when the coarse-grained fuel are gasified in a fixed-bed reactor as described hereinbefore and the fine-grained fuel is not gasified but burnt and used to generate power. This results in the generation of about 740 kWh of electric energy.

What is claimed is:

1. A process of gasifying solid fuels with gasifying agents including steam and oxygen-containing gas by contacting said gasifying agents with a coarse-grained solid fuel in particle sizes of at least 2 mm so as to effect gasification comprising
    (a) conducting said gasification in a first reactor under a pressure of 5 to 150 bars in a fixed bed gasifier while said bed is slightly descending, the gasifying agents being introduced into the fixed bed gasifier from below and the incombustible mineral constituents being withdrawn from the lower end of the fixed bed gasifier as solid ash or liquid slag, and
    (b) gasifying fine-grained solid fuels in a second reactor in a fluidized bed gasifier under a pressure of 1 to 100 bars, said second reactor being separated from said first reactor, the product gas formed in the second reactor and having a temperature of 700° to 1200° C. being indirectly cooled with water to convert said water to steam, said steam being supplied as a gasifying agent to the first reactor and the product gas from the first reactor being indirectly cooled with water whereby to convert said water to steam and at least part of the resulting steam being supplied as a gasifying agent to the second reactor.

2. A process according to claim 1, wherein the fine-grained solid fuels are gasified in the fluidized bed under a pressure of 1 to 100 bars, and the product gas leaving the fluidized bed has a temperature of 800° to 1100° C.

3. A process according to claim 1, wherein the steam supplied as gasifying agent to the fixed-bed gasifier has a temperature of about 300° to 600° C.

4. A process according to claim 1, wherein the steam supplied as gasifying agent to the fluidized-bed gasifier has a temperature of about 200° to 350° C.

5. A process according to claim 1, wherein the steam generated by an indirect heat exchange with the product gas from the fixed-bed gasifier is superheated by an indirect heat exchange with the product gas from the fluidized-bed gasifier and is subsequently supplied as a gasifying agent to the fluidized-bed gasifier.

6. A process according to claim 1, wherein the steam supplied to the fixed bed gasifier has a temperature of about 400° to 500° C.

7. A process according to claim 1, wherein said fluidized bed gasifier operates at a pressure of 1 to 30 bars.

8. A process according to claim 1, wherein the fixed bed gasifier is a Lurgi gas generator comprising a rotary grate.

9. A process according to claim 1, wherein said indirect cooling of said product gas from said first reactor comprises directing said product gas from said first reactor to a scrubber-cooler where said product gas from said first reactor is sprayed with water and the resultant gas at a temperature of about 150° to 220° C. is directed to a waste heat boiler first heat exchanger to generate steam.

10. A process according to claim 9, wherein said generated steam is directed through a second heat exchanger where it is heated by the product gas from the second reactor after said product gas from the second reactor has passed through a steam superheater third heat exchanger, said generated steam being heated to a temperature of about 200° to 350° C. and being directed to said second reactor.

* * * * *